United States Patent [19]

Hayne

[11] 3,942,006

[45] Mar. 2, 1976

[54] CORONA GENERATOR CLEANING APPARATUS

[75] Inventor: Thomas F. Hayne, Fairport, N.Y.

[73] Assignee: Xerox Corporation, Stamford, Conn.

[22] Filed: Nov. 16, 1972

[21] Appl. No.: 307,250

[52] U.S. Cl. .............................. 250/326; 317/262 A
[51] Int. Cl.² ...................... H01G 1/06; H01T 19/04
[58] Field of Search .................... 250/324, 325, 326; 317/262 A

[56] References Cited

UNITED STATES PATENTS

| | | | |
|---|---|---|---|
| 2,778,946 | 1/1957 | Mayo | 250/325 |
| 3,496,352 | 2/1970 | Jugle | 250/326 |

OTHER PUBLICATIONS

"Corona Unit Cleaning Device," by W. F. Voit, Jr., from IBM Technical Disclosure Bulletin, Vol. 11, No. 8, Jan. 1969, p. 1025.

*Primary Examiner*—Paul L. Gensler
*Assistant Examiner*—T. N. Grigsby
*Attorney, Agent, or Firm*—H. Fleischer; J. J. Ralabate; C. A. Green

[57] ABSTRACT

A corona generating apparatus in which the coronode wires and grid wires thereof are cleaned to remove particles therefrom. A wiper is positioned within the shield contacting the coronode wires and grid wires. The wiper moves along the coronode wires and grid wires to remove contaminating particles therefrom.

8 Claims, 2 Drawing Figures

22
24
26
C
62
20
18
28
B
A
60
12
10
16
64
F
14
52
56
30
54
E
50
38
32
34
D
36
58
48
46
42
44

CORONA GENERATOR CLEANING APPARATUS

The foregoing abstract is neither intended to define the invention disclosed in the specification, nor is it intended to be limiting as to the scope of the invention in any way.

BACKGROUND OF THE INVENTION

This invention relates generally to an electrophotographic printing machine, and more particularly concerns a corona generating apparatus for charging a photoconductive surface to a substantially uniform potential.

In a typical electrophotographic printing machine, a photoconductive surface is electrostatically charged substantially uniformly thereover and then exposed to a light pattern of the image being reproduced. The light pattern discharges the electrostatic charge in the areas where the light strikes the photoconductive surface. As a consequence the remaining charge on the photoconductive surface forms an electrostatic charge pattern in image configuration, i.e., an electrostatic latent image. The electrostatic latent image may then be developed by contacting it with finely divided electrostatically attractable material, such as toner particles. The toner particles adhere electrostatically to the photoconductive surface in a pattern corresponding to the latent image recorded thereon. Thereafter, the developed image is transferred to a suitable sheet of support material, such as paper, amongst others, which is secured releasably to a transfer member. The powder image transferred to a sheet of support material is subsequently suitably affixed thereto to form a permanent print thereof.

With the advent of multi-color electrophotographic printing involving the utilization of various components adapted to produce a series of electrostatic latent images in which each image represents a particular color in the original, there is a need to transfer successive single color toner powder images onto the sheet of support material. Incidentally, it will be appreciated that a black and white or single color reproduction, such as a red, cyan, magenta or yellow print, requires only a single toner powder image, whereas a multicolor reproduction may necessitate a plurality of differently colored toner powder images. It, therefore, follows that the amount of toner particles required in the formation of a multi-color copy may be appreciably greater than that required for the production of a single color copy. For example, in a three color subtractive system, cyan, magenta, and yellow toner particles are successively transferred to the support material. Thus, the formation of a multi-color copy from a colored original requires more toner particles than that utilized in the formation of black and white copy. It is evident, therefore, that this substantially increases the potential amount of contamination from dust and toner particles.

In electrophotographic printing, it is necessary to deposit a substantially uniform potential on the photoreceptor surface to insure that electrostatic charges may be selectively dissipated in accordance with the light pattern of the image being reproduced. This may be achieved by such prior art devices as the corona generating device described in U.S. Pat. No. 2,836,725 issued to Vyverberg in 1958. A corona generating device generally includes a corona discharge electrode, such as a coronode wire, surrounded by a conductive shield. The corona discharge electrode is adapted to be supplied with a DC voltage of sufficient magnitude to create a corona current flow from the electrode to the surface of a photoreceptor spaced therefrom. Another type of corona generating apparatus particularly suitable for use in multi-color electrophotographic printing is a corona generating device such as is described in U.S. Pat. No. 2,778,946 issued to Mayo in 1957. A typical corona generating device includes a corona discharge electrode such as coronode wire, surrounded by a conductive shield with a grid interposed between the coronode wire and the photoconductive surface. In a corona generating device, the shield is normally at ground potential and the grid is operated at some predetermined potential between the discharge electrode voltage and ground voltage. The grid controls the charge applied to the photoconductive surface.

Although the corona generating device or scorotron is advantageously utilized to substantially uniformly charge a photoconductive surface, it is suitably adapted for various other applications. For example, corona generating device electrostatically transfer a powder image from a photoconductive surface to a sheet of support material as well as remove background toner particles therefrom, and preclean corona generating device neutralize the charge on toner particles adhering to the photoconductive surface after the transfer of the powder image to the support material. However, a disadvantage of corona generating devices is their sensitivity to the accumulation of dust and toner particles. Dust or toner particles adhering to the coronode wires will decrease the corona current generated therefrom as the density of particle accumulation increases. Contrawise, dust or toner particles adhering to the grid wires will increase the corona current generated therefrom as the density of particle accumulation increases. However, the increase in current produced by particle accumulation on the grid wires is not inversely proportional to the decrease in current produced by particle accumulation in the coronode wires. Thus, the performance of a corona generating device remains sensitive to dust and toner particles.

Heretofore, various prior art devices have been developed for cleaning corona generating devices. By way of example, IBM Technical Disclosure Bulletin, Volume 11, Number 8 of January 1969 describes cleaning pads surrounding the coronode wires of a corona generating device. The cleaning pads are reciprocated along the length of the coronode wires to remove dust and toner particles accumulated thereon. Similarly, copending application Ser. No. 245,306, filed in 1972, now abandoned describes cleaning pads surrounding the coronode wires and contacting the interior surface of the shield surrounding the coronode wires. Once again, the cleaning pads are reciprocated along the length of the coronode wires and shield to remove dust and toner particles, accumulated thereon. However, neither of the foregoing approaches describe cleaning of the grid wires used in a corona generating device.

Accordingly, it is a primary object of the present invention to improve the cleaning of a corona generating apparatus.

SUMMARY OF THE INVENTION

Briefly stated, and in accordance with the present invention, there is provided a corona generating apparatus arranged to have particles cleaned therefrom.

In the present instance, the preferred embodiment of the corona generating apparatus includes an elongated shield defining an open ended chamber. Grid means, disposed in the open end of the shield chamber, extend in substantially a longitudinal direction along the length of the shield.

A corona discharge electrode is interposed between the shield and grid means. Particles are removed from the discharge electrode and the interior surface of the grid means opposed from the discharge electrode by cleaning means in communication therewith.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents that may be included within the spirit and scope of the invention as defined by the appended claims.

DETAILED DESCRIPTION OF THE INVENTION

Figure 1:
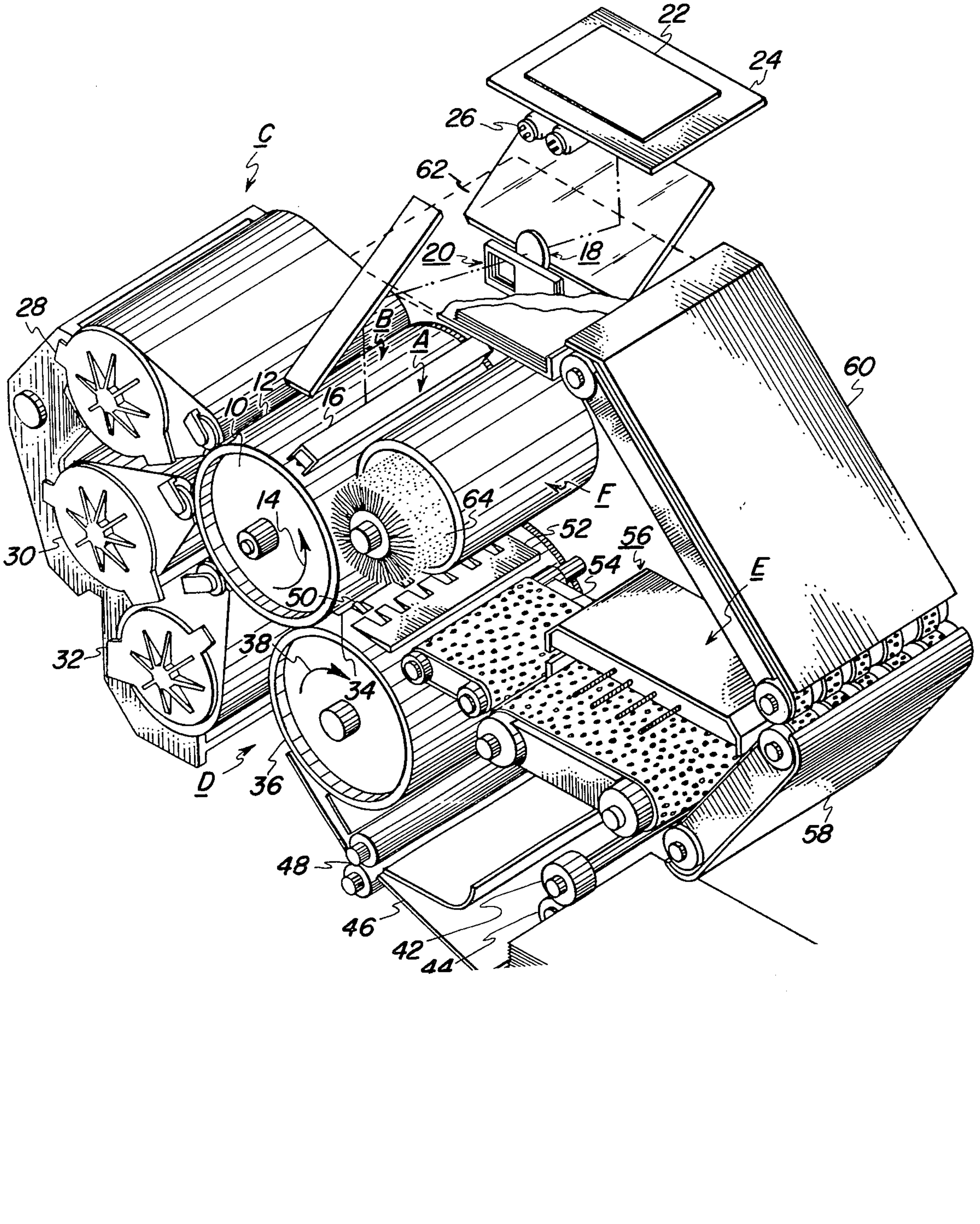
FIG. 1 is a schematic perspective view illustrating an electrophotographic printing machine having the corona generating apparatus of the present invention incorporated therein.

For a general understanding of the disclosed electrophotographic printing machine which the present invention may be incorporated, continued reference is had to the drawings wherein like numerals have been used throughout to designate like elements. FIG. 1 schematically illustrates the various components of a printing machine for producing multi-color copies from a colored original. Although the corona generating apparatus of the present invention is particularly well adapted for use in an electrophotographic printing machine, it should become evident from the following discussion that it is equally well suited for use in a wide variety of electrostatographic printing machines and is not necessarily limited in its application to the particular embodiment shown herein.

Turning now to FIG. 1, there is shown a printing machine employing a photoconductive member having a drum 10 mounted rotatably on a shaft (not shown) of the printing machine. Drum 10 has a photoconductive surface 12 thereon, and is rotated in the direction of arrow 14 to pass sequentially through a series of processing stations. The various machine components and drum 10 are driven at a predetermined speed relative to each other from a common drive motor (not shown). This coordinates the machine operations and produces the proper sequence of events at the processing stations hereinafter described.

Initially, drum 10 rotates photoconductive surface 12 through charging station A. Charging station A has positioned thereat an ion source or the corona generating apparatus of the present invention, indicated generally at 16. Corona generating apparatus 16 extends in a generally transverse direction across photoconductive surface 12. In this way, photoconductive surface 12 is charged to a relatively high substantially uniform potential by corona generator apparatus 16. Corona generating apparatus 16 will be described in detail hereinafter with reference to FIG. 2. Continuing now with the description of the various processing stations in the electrophotographic printing machine of FIG. 1, drum 10 is next rotated to exposure station B.

At exposure station B, a color filtered light image of the original document is projected onto photoconductive surface 12. Exposure station B, preferably, includes thereat a moving lens system, generally designated by the reference numeral 18, and a color filter mechanism, shown generally at 20. A suitable moving lens system is described in U.S. Pat. No. 3,062,108 issued to Mayo in 1962. As shown in FIG. 1, an original document 22 such as a sheet of paper, book or the like is placed face down upon transparent viewing platen 24. Lamp assembly 26 and lens system 18 are moved in a timed relation with drum 10 to scan successive incremental areas of original document 22 disposed upon platen 24. In this manner, a flowing light image of original document 22 is produced which is projected on photoconductive surface 12. During exposure, filter mechanism 20 interposes selected color filters into the optical light path of lens 18. The color filter operates on the light rays passing through lens 18 to record an electrostatic latent image on photoconductive surface 12 corresponding to a preselected spectral region of the electromagnetic wave spectrum, hereinafter referred to as a single color electrostatic latent image.

The single color electrostatic latent image recorded on photoconductive surface 12 is next rotated to development station C. Development station C includes thereat three individual developer units, generally indicated by the reference numerals 28, 30 and 32, respectively. A suitable development station employing a plurality of developer units is disclosed in copending application Ser. No. 255,259 filed in 1972 and now U.S. Pat. No. 3,854,449. Preferably, the developer units are all of the magnetic brush type. A typical magnetic brush system utilizes a magnetizable developer mix which includes carrier granules and toner particles. The developer mix is continually brought through a directional flux field to form a brush thereof. As drum 10 rotates, photoconductive surface 12 passes through the brush of developer mix, and the electrostatic latent image recorded thereon contacts the developer mix. Each of the respective developer units 28, 30 and 32 contain discretely colored toner particles corresponding to the complement of the spectral region of the wavelength of light transmitted through filter 20, e.g. a green filtered electrostatic latent image is rendered visible by depositing green absorbing magenta toner particles thereon, blue and red latent images are developed with yellow and cyan toner particles, respectively.

After the electrostatic latent image recorded on photoconductive surface 12 is developed, drum 10 rotates to transfer station D. At transfer station D, the toner powder image adhering electrostatically to photoconductive surface 12 is transferred to a sheet of final support material 34. Final support material 34 may be, amongst others, plain paper or a thermoplastic sheet. Sheet 34 is secured releasably to a bias transfer roll, shown generally at 36. As indicated in FIG. 1, bias transfer roll 36 rotates in the direction of arrow 38 to move support material 34 therewith in a recirculating path. Bias transfer roll 36 is biased electrically to a potential of sufficient magnitude and polarity to attract electrostatically toner particles from the latent image rotated on photoconductive surface 12 to support material 34. A suitably electrically biased transfer roll is described in U.S. Pat. No. 3,612,677 issued to Langdon et al in 1971. Transfer roll 36 rotates in synchronism with drum 10, i.e. transfer roll 36 and drum 10 have substantially the same angular velocity. Inasmuch as support material 34 is secured releasably thereon for movement in a recirculating path therewith, successive toner powder images may be transferred from photoconductive surface 12 to support material 34 in superimposed registration with one another. Support material 34 is advanced from stack 40 thereof. Feed roll 42 in operative communication with retard roll 44 advances and separates the uppermost sheet from stack 40. The advancing sheet moves into chute 46 which directs the sheet between the nip of register rolls 48. Thereafter, gripper fingers 50 mounted on transfer roll 36 secure releasably thereon support material 34 for movement therewith in a recirculating path. With continued reference to FIG. 1, gripper fingers 50 release sheet 34 and stripper bar 52 separates sheet 34 from transfer roll 36. Sheet 34 is, thereafter, advanced on endless belt conveyor 54 to fixing station E where a fuser, indicated generally at 56, coalesces the transferred powder image to sheet 34. A suitable fuser is described in U.S. Pat. No. 3,498,592 issued to Moser et al in 1970. After the fixing process, sheet 34 is advanced by endless belt conveyors 58 and 60 to catch tray 62 for subsequent removal therefrom by the machine operator.

Although a preponderance of the toner particles are transferred to support material 34, invariably some residual toner particles remain on photoconductive surface 12 after the transfer of the powder image to support material 34. The residual toner particles are removed from photoconductive surface 12 of drum 10 as it moves through cleaning station F. Here the residual toner particles are first brought under the influence of a cleaning corona generating device (not shown) adapted to neutralize the electrostatic charge remaining on the toner particles. The neutralized toner particles are then mechanically removed from photoconductive surface 12 by a rotatably mounted fiber brush 64. A suitable brush cleaning device is described in U.S. Pat. No. 3,590,412 issued to Gerbasi in 1971. Rotatably mounted brush 64 is positioned at cleaning station F and maintained in contact with photoconductive surface 12. In this way, residual toner particles remaining on photoconductive surface 12 after each transfer operation are cleaned therefrom.

It is believed that the foregoing description is sufficient for purposes of the present application to show the general operation of an electrophotographic printing machine embodying the teachings of the present invention.

Figure 2:
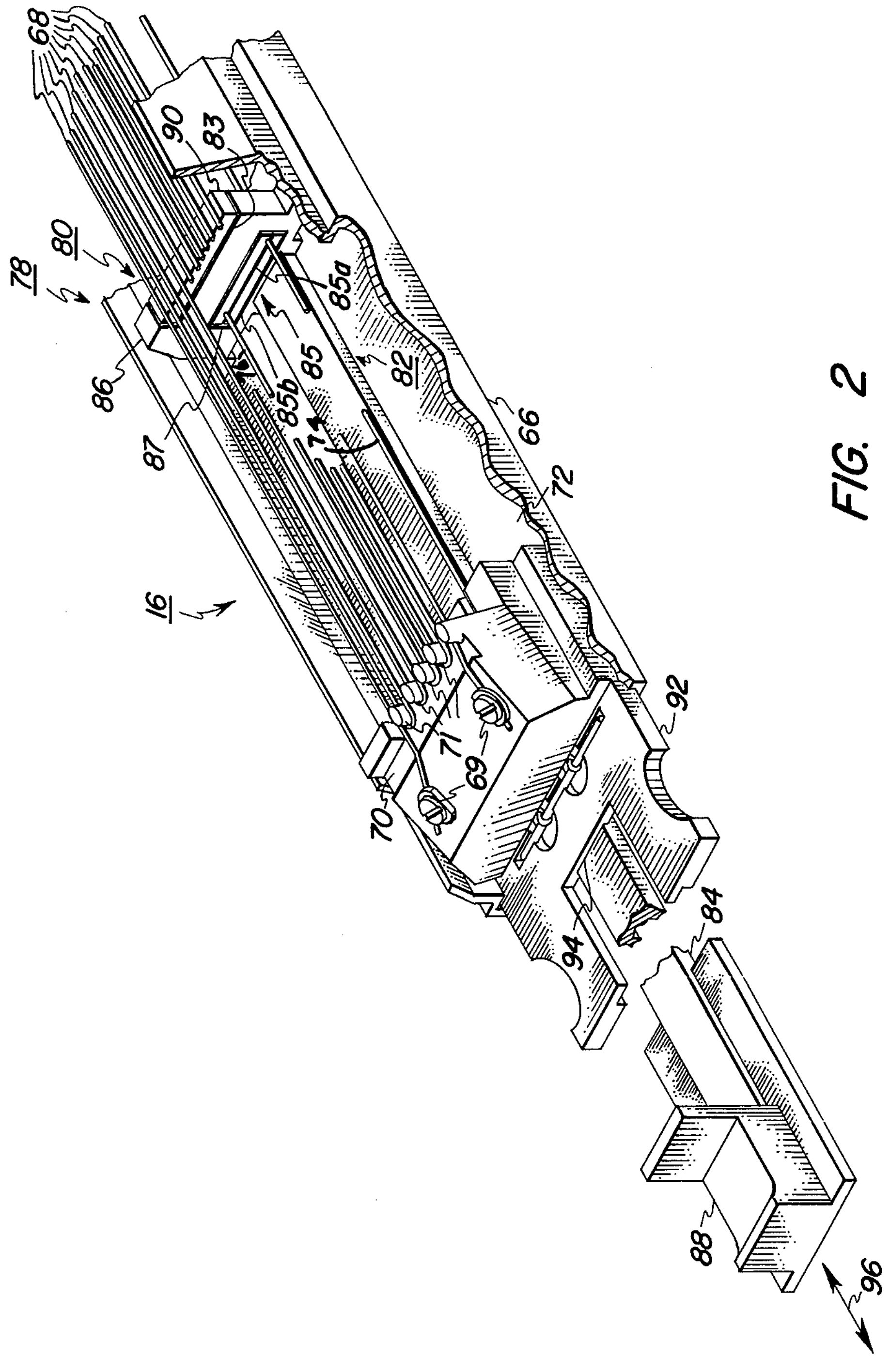
FIG. 2 is a perspective view of the corona generating apparatus used in the FIG. 1 printing machine.

Referring now to the specific subject matter of the present invention, FIG. 2 depicts corona generating apparatus 16 thereat. Corona generating apparatus 16 includes an elongated conductive shield 66 defining an open ended chamber opposed from and closely spaced to photoconductive surface 12. Shield 66 is a U-shaped conductive housing and, preferably, is made from an aluminum extrusion. Grid means or a plurality of substantially parallel, spaced, fine conductive wires 68 (in this case 10) extend in a longitudinal direction from one end of shield 66 to the other end thereof and across about three-quarters of the open end of the chamber therein. An insulating plate 70 is affixed permanently to either end of shield 66 by suitable means (not shown), e.g. fasteners or adhesive. Grid wires 68 are preferably formed from a single wire attached to fasteners 69 and entrained about uprights 71 on insulating plate 70. Interposed between grid wires 68 and back wall 72 of shield 66 is a corona discharge electrode or a pair of coronode wires 74 and 76, respectively. Coronode wires 74 and 76 are suitably secured to insulating plate 70, preferably by fasteners (not shown). Both grid wires 68 and coronode wires 74 and 76 respectively are, preferably, made from a conductive material for example tungsten with a tungsten oxide coating thereon. Insulating plate 70 is, preferably, made from a dielectric material such as a glass alkyd, Lucite, Plexiglas, Lexan or the like. As depicted in FIG. 2, coronode wire 76 is positioned in the chamber of shield 66 that is not covered by grid wires 68, i.e. grid wires 68 do not extend over this portion of the open end of shield 66. As hereinbefore mentioned, grid wires 68 extend only across about three-quarters of the open end of shield 66. This permits rapid and roughly controlled charging of photoconductive surface in the lead section or the portion of shield 66 not covered by grid wires 68. Slow and well-controlled charging is obtained over the trailing section or the portion of shield 66 covered by grid wires 68. A corona generator means or suitable high voltage source (not shown) excites coronode wires 74 and 76 to a voltage preferably ranging from about 6,000 volts to about 8,000 volts, the coronode wire current ranging from about 200 to about 500 micro amperes. Field applying means or a low voltage source (not shown) excites grid wires 68 to, preferably, about 800 volts. In operation, drum 10 rotates in the direction of arrow 14 permitting coronode wire 76, i.e. the coronode wire positioned in the one-quarter of shield 66 not covered by grid wires 68, to roughly charge photoconductive surface 12 to a substantially uniform potential. Thereafter, slow and well-controlled charging of photoconductive surface 12 is obtained from coronode wire 74 operatively associated with grid wires 68. Grid wires 68 have the bias voltage thereof at about the desired final voltage of photoconductive surface 12. In this way, the final charging is field sensitive. For example, as photoconductive surface 12 moves under grid wires 68, it acquires a charge to increase its voltage up to about that of grid wires 68, however, further charging thereof is suppressed by grid wires 68. That is, when photoconductive surface 12 is charged to a voltage substantially the same as that of grid wires 68, most of the corona current under grid wires 68 is conducted thereto rather than to photoconductive surface 12.

In order to reduce the sensitivity of corona generating apparatus 16 to dirt, cleaning means or cleaning assembly 78 is provided therein. Deposits of toner particles and dust collected on coronode wire 74 and 76, respectively, and grid wires 68 are removed by cleaning assembly 78. Cleaning assembly 78 comprises a wiper member depicted generally by the reference numeral 80, preferably formed of a slightly abrasive material such as felt, foam, or expanded polyester, and moving means or a support carriage, generally indicted at 82. Wiper member 80 is adapted to be reciprocated by a support carriage depicted generally at 82 to remove contaminates from coronode wires 74 and 76 and the interior surface opposed therefrom of grid wires 68. Preferably, support carriage 82 comprises an elongated rod 84 attached to support 86. Rod 84 extends through insulating plate 70 affixed to the end portions of shield 66. Preferably, rod 84 extends longitudinally through the center of shield 66. Handle 88 is attached to rod 84 and is external to one end of shield 66 in the region of insulating plate 70 permitting an operator to grasp handle 88 to reciprocate rod 84 and, in turn, support 86 having wiper member 80 supported thereby. Support 86 and elongated rod 84 are, preferably, formed of a non-conductive material such as nylon. Wiper member 80 includes a grid wiper 90 suitably affixed, e.g. by adhesive, in notch 83 of support 86, and a coronode wiper indicated generally at 85, suitably affixed, e.g. by adhesive, in aperture or rectangular opening 87 of support 86. Coronode wiper 85 comprises an upper wiper 85*a* and a lower wiper 85*b* in substantial contact with one another and adapted to have coronode wires 74 and 76 sandwiched therebetween. Grid wiper 90 is adapted to engage the interior surface, opposed from coronode wires 74 and 76, of grid wires 68. Guide means or block 92 is preferably integral with insulating plate 70 affixed to the end portions of shield 66 and has a channel 94 therein adapted to receive elongated rod 84. Channel 94 is arranged to guide rod 84 in the movement thereof along the length of coronode wires 74 and 76.

Corona generating apparatus 16 is received by a supprting arm (not shown) of the electrophotographic printing machine of FIG. 1. Shield 66 is affixed to the frame of the printing machine such that it extends in a longitudinal direction transversely across photoconductive surface 12. To clean coronode wires 74 and 76 and grid wires 68, the operator grasps handle 88 and moves it coaxially in the direction of arrow 96 advancing support carriage 86 and wiper member 80 along the length of coronode wire 74 and 76, and grid wires 68. Support carriage 86 is then pushed back to its normal position adjacent the other end of shield 66 where it remains until the next subsequent cleaning operation. Such relative movement of the cleaning apparatus within shield 66 causes wiper member 80 to traverse coronode wires 74 and 76, and the inner surface opposed therefrom of grid wires 68, thereby removing solid materials, e.g. dust and toner particles, from the contacted surfaces.

In recapitulation, it is evident that there has been provided a corona generating apparatus adapted to have toner particles and dust cleaned therefrom in order to maintain the charging voltage produced on the photoconductive surface substantially constant. This is achieved in the present invention by advancing a wiper member along a pair of coronode wires and the interior surface of the grid wires. As the wiper member advances, it contacts the foregoing wires and removes toner particles and dust therefrom.

Thus, it is apparent that there has been provided in accordance with the present invention, a corona generating apparatus that fully satisfies the objects, aims and advantages set forth above. While this invention has been described in connection with specific embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. A corona generating apparatus, including:

an elongated shield defining an open ended chamber;

a pair of spaced substantially parallel conductive coronode wires mounted in said shield extending substantially in a longitudinal direction along the length of said shield;

a plurality of spaced, substantially parallel grid wires mounted in said shield extending substantially in a longitudinal direction along the length thereof, said plurality of grid wires partially enclosing the open end of said shield with one said coronode wires being disposed in the chamber therebeneath and the other of said coronode wires being disposed in the unenclosed portion of the chamber of said shield;

a wiper member positioned within said shield contacting said pair of coronode wires and the interior surface of said grid wires opposed from said pair of coronode wires; and means for moving said wiper member in substantially a longitudinal direction along the length of said pair of coronode wires and said grid wires.

2. An apparatus as recited in claim 1, further including:

means for generating a corona discharge from said coronode wires; and means for applying a field regulating potential to said grid wires.

3. An apparatus as recited in claim 2, wherein said moving means includes:

a guide means affixed to at least one end portion of said shield, and a rod member secured to said wiper member, said rod member being disposed in said guide means for advancing said wiper member along the length of said pair of coronode wires and the interior surface of said grid wires opposed from said pair of coronode wires.

4. An apparatus as recited in claim 3, wherein said shield includes a substantially U-shaped conductive housing.

5. An electrophotographic printing machine of the type having a photoconductive surface adapted to be sensitized by the application of a substantially uniform electrostatic charge from an ion source closely spaced to the photoconductive surface, wherein the improvement in said ion source includes:

an elongated shield defining an open ended chamber, said shield being positioned to extend substantially transversely across the photoconductive surface;

a pair of spaced substantially parallel conductive coronode wires mounted in said shield, said pair of coronode wires extending substantially in a longitudinal direction along the length of said shield;

a plurality of spaced, substantially parallel conductive grid wires mounted in said shield and extending substantially in a longitudinal direction along the length thereof, said plurality of grid wires partially enclosing the open end of said shield with one of said coronode wires being disposed in the chamber therebeneath and the other of said coronode wires being disposed in the unenclosed portion of the chamber of said shield, said grid wires being interposed between the photoconductive surface and said shield;

a wiper member positioned within said shield contacting said pair of coronode wires and the interior surface of said grid wires opposed from said pair of coronode wires; and means for moving said wiper member in substantially a longitudinal direction along the length of said pair of coronode wires and said grid wires.

6. An apparatus as recited in claim 5, further including:

means for generating an electrostatic charge from said coronode wires; and means for applying a field regulating potential to said grid wires.

7. An apparatus as recited in claim 6, wherein said moving means includes:

guide means affixed to at least one end portion of said shield; and a rod member secured to said wiper member, said rod member being disposed in said guide means for advancing said wiper member along the length of said pair of coronode wires and the interior surface of said grid wires opposed from said pair of coronode wires.

8. An apparatus as recited in claim 7, wherein said shield includes a substantially U-shaped conductive housing.

* * * * *